US010839228B2

(12) United States Patent
Danielsson et al.

(10) Patent No.: US 10,839,228 B2
(45) Date of Patent: Nov. 17, 2020

(54) METHOD AND SYSTEM FOR TRACKING AN OBJECT IN A DEFINED AREA

(71) Applicant: Axis AB, Lund (SE)

(72) Inventors: Niclas Danielsson, Lund (SE); Anders Hansson, Lund (SE)

(73) Assignee: Axis AB, Lund (SE)

( * ) Notice: Subject to any disclaimer, the term of this patent is extended or adjusted under 35 U.S.C. 154(b) by 268 days.

(21) Appl. No.: 15/787,249

(22) Filed: Oct. 18, 2017

(65) Prior Publication Data

US 2018/0107880 A1 Apr. 19, 2018

(30) Foreign Application Priority Data

Oct. 18, 2016 (EP) ..................................... 16194411

(51) Int. Cl.
*G06K 9/00* (2006.01)
*G06F 16/783* (2019.01)
(Continued)

(52) U.S. Cl.
CPC ....... *G06K 9/00771* (2013.01); *G06F 16/784* (2019.01); *G06K 9/00248* (2013.01);
(Continued)

(58) Field of Classification Search
CPC .......... G06K 9/00771; G06K 9/00248; G06K 9/00268; G06K 9/00288; G06K 9/00348;
(Continued)

(56) References Cited

U.S. PATENT DOCUMENTS

2003/0039380 A1* 2/2003 Sukegawa .......... G06K 9/00288
382/118
2007/0268145 A1* 11/2007 Bazakos .................. G07C 9/28
340/573.1

(Continued)

FOREIGN PATENT DOCUMENTS

CN 101778260 A 7/2010
EP 2 038 860 B1 4/2013

(Continued)

OTHER PUBLICATIONS

Hamdoun, Omar, et al. "Person re-identification in multi-camera system by signature based on interest point descriptors collected on short video sequences." In 2008 Second ACM/IEEE International Conference on Distributed Smart Cameras, pp. 1-6. IEEE, 2008. (Year: 2008).*

(Continued)

*Primary Examiner* — Carol Wang
(74) *Attorney, Agent, or Firm* — Volpe Koenig

(57) ABSTRACT

A method and system for tracking objects in a defined area compares image data of a detected object to profiles of persons that have entered the defined area to find the best match and connect the profile of the best match to the detected object. Identification profiles of persons that have been identified, by presenting their credentials, when entering the defined area are registered as candidates and are later matched with objects detected in the defined area. The system and method use the physical access control system of the defined area to reduce the number of candidates for the detected objects to the most likely candidates. The processing time and need for resources of the object tracking in the defined area are thereby reduced.

20 Claims, 5 Drawing Sheets

(51) Int. Cl.
*G08B 13/194* (2006.01)
*G06T 7/292* (2017.01)
*G06T 7/90* (2017.01)
*G06T 7/70* (2017.01)
*G06T 7/40* (2017.01)

(52) U.S. Cl.
CPC ..... *G06K 9/00268* (2013.01); *G06K 9/00288* (2013.01); *G06K 9/00348* (2013.01); *G06T 7/292* (2017.01); *G06T 7/40* (2013.01); *G06T 7/70* (2017.01); *G06T 7/90* (2017.01); *G08B 13/194* (2013.01); *G06T 2207/10016* (2013.01); *G06T 2207/30201* (2013.01); *G06T 2207/30232* (2013.01)

(58) Field of Classification Search
CPC ........... G06K 9/00221; G06K 9/00362; G06K 9/6201; G06K 9/6256; G06T 7/292; G06T 7/90; G06T 7/70; G06T 7/40; G06T 2207/10016; G06T 2207/30201; G06T 2207/30232; G08B 13/194; G06F 16/583; G06F 16/51; G06F 16/784
See application file for complete search history.

(56) References Cited

U.S. PATENT DOCUMENTS

| | | | |
|---|---|---|---|
| 2008/0180525 A1 | 7/2008 | Kanehira et al. | |
| 2009/0127328 A1* | 5/2009 | Aissa | G06K 9/00885 235/377 |
| 2010/0013926 A1 | 1/2010 | Lipton et al. | |
| 2010/0033302 A1* | 2/2010 | Yamamoto | G06K 9/00899 340/5.82 |
| 2010/0134310 A1* | 6/2010 | Zheng | G07C 9/25 340/686.6 |
| 2011/0311112 A1* | 12/2011 | Matsuyama | G06K 9/00281 382/118 |
| 2012/0169880 A1 | 7/2012 | Williamson | |
| 2013/0050502 A1* | 2/2013 | Saito | G06T 7/20 348/169 |
| 2013/0184592 A1 | 7/2013 | Venetianer et al. | |
| 2013/0194421 A1* | 8/2013 | Kita | H04N 7/18 348/143 |
| 2014/0139680 A1 | 5/2014 | Huang et al. | |
| 2015/0288928 A1 | 10/2015 | McCoy et al. | |
| 2015/0363636 A1* | 12/2015 | Tate | G06K 9/00295 382/103 |
| 2016/0253554 A1* | 9/2016 | Tsuji | G06K 9/00369 382/115 |
| 2016/0358332 A1* | 12/2016 | Watanabe | G06T 7/0012 |
| 2017/0063852 A1* | 3/2017 | Azar | G07C 9/37 |
| 2017/0103265 A1* | 4/2017 | Channah | G06K 9/00771 |
| 2017/0278348 A1* | 9/2017 | Takeda | G07F 17/3241 |
| 2017/0332050 A1* | 11/2017 | Yamashita | H04N 7/181 |
| 2018/0032986 A1* | 2/2018 | Miyagi | G06Q 20/202 |
| 2018/0114228 A1* | 4/2018 | Singh | G06K 9/00335 |
| 2018/0349651 A1* | 12/2018 | Snediker | G06F 21/88 |

FOREIGN PATENT DOCUMENTS

| | | | | |
|---|---|---|---|---|
| WO | 2015/153865 A1 | 10/2015 | | |
| WO | WO-2015198323 A2 | * 12/2015 | ........... | G06K 9/4638 |
| WO | WO-2016044442 A1 | * 3/2016 | ........... | G06F 15/16 |

OTHER PUBLICATIONS

"A Survey and Proposed Framework on the Soft Biometrics Technique for Human Identification in Intelligent Video Surveillance System", Min-gu Kim et al.; Journal of Biomedicine and Biotechnology, vol. 2012, Jan. 1, 2012, pp. 1-7, XP055361177.

"A Soft-Biometrics Dataset for Person Tracking and Re-Identification", Schumann et al., 2014 11th IEEE International Conference on Advanced Video and Signal Based Surveillance (AVSS), IEEE, Aug. 26, 2014, pp. 193-198, XP032656499.

"Technology for Integrating Face Recognition and Motion Tracking Into Video Surveillance Systems"; SentiVeillance Technology Capabilities; http://www.neurotechnology.com/sentiveillance.html; internet search, Jan. 4, 2016.

"Fusion of Radio Frequency Identification (RFID) and Fingerprint in Boarding School Monitoring System (BoSs)"; Mohd Helmy Abd Wahab, et al.; ResearchGate, Mar. 2013; retrieved Nov. 24, 2015.

"Airport Biometric Technology Requirements: A Checklist for Facial-Identification Systems", Robert C. Smallback, Jr., Apr. 23, 2002; http://www.tmcnet.com/biomag/features/smallback.htm.

EP 16 19 4411.1 European Search Report (dated Apr. 11, 2017).

\* cited by examiner

METHOD AND SYSTEM FOR TRACKING AN OBJECT IN A DEFINED AREA

FIELD OF INVENTION

The present teachings relate to the field of monitoring. In particular, the teachings relate to a method and system for tracking an object in a defined area monitored by cameras.

BACKGROUND

Systems for object tracking have interesting applications within the field of camera monitoring. In many monitoring systems it is desired to be able to track objects, or more particularly persons, both in live video material and in recorded video material for forensic video searches.

Object tracking systems aid in various safety related situations where a person's activities needs to be investigated in connection to e.g. criminal activities. The object tracking systems could however also be useful for non-security related applications such as collecting statistics for surveys. Many object tracking systems are applied to camera systems monitoring a defined area such as an office complex, a factory, a hotel, a gated community, a campus, or a premises where persons preregister to get access credentials.

In order to track an object in a system of monitoring cameras (which may or may not have overlapping views) it is essential to be able to recognize the object, or at least a feature of the object, in image data from the different monitoring cameras. As the different monitoring cameras may have different optical configurations comprising different lenses, apertures, image sensors etc. and different image processing settings this might influence the appearance of objects in image data from the different cameras in the system. Further, the cameras may be mounted at different physical locations e.g. having different illumination schemes which also affects the appearance of objects in the image data acquired and processed by the cameras. These problems are discussed in U.S. Pat. No. 7,529,411 B2.

U.S. Pat. No. 7,529,411 B2 teaches a system for recognition analysis of multiple streams of video where identifying information extracted from images captured by the video surveillance system are compared to one or more stored profiles. In a preferred embodiment of the system disclosed in U.S. Pat. No. 7,529,411 B2 the comparison is made with each stored profile, although it is possible that comparisons will only be made with a selected subset of the stored profiles.

A problem with the system discussed in U.S. Pat. No. 7,529,411 B2 is however that the recognition analysis will require a lot of processing power and processing time.

SUMMARY

In view of the above, it is thus an object to provide an improved method and system for tracking objects in a defined area. In particular, it is an object to provide a method and a system which decreases the processing time and performance needed to track an object in a defined area.

According to a first aspect, the above object is achieved by a method for tracking a person. The method for tracking a person comprising the steps of: identifying a person entering a defined area by matching credentials presented by the person to credentials in a database including credentials of preregistered persons, registering an identification profile of the identified person in a list of persons that are tracked in the area, the identification profile comprising information for identifying the person from image data, receiving image data from a scene within the area, creating a set of identification characteristics for an object detected in the received image data, comparing the created set of identification characteristics of the detected object to the registered identification profiles in the list of persons that are tracked in the area, determining the identification profile in the list of persons that are tracked in the area that best match the set of identification characteristics of the detected object, and connecting the detected object to the determined identification profile that best match the identification profile of the detected object. An advantage of the method for tracking a person is that the processing time needed to track an object in a defined area is reduced and the reliability of correctly identifying a person from image data is increased as the identification characteristics of an object detected in image data are compared to the identification profiles of the persons presently tracked in the area. One reason for the reduced processing time is that fewer identification profiles need to be compared to the identification characteristics of the detected object. The increase in reliability is a result of that the likelihood of the identification characteristics being similarly matched to a plurality of identification profiles is decreased. An effect of this is also that with fewer identification profiles to compare with the reliability of the matching will increase as the probability of having candidates with similar features is decreasing, i.e. you may say that it probably will be easier for the process to correctly identify the person in the image due to greater difference between the identification profiles in the reduced list of persons to compare with as a result of the list includes fewer entries. This way the matching, and hence one of the most processing demanding steps of a tracking method, will be focused on the most likely candidates and not necessarily all theoretically possible candidates. It is a further advantage that the identification profile of the persons that have been identified as entering the defined area is registered on the list of persons tracked in the area and that the identification profile is connected to the credentials used for identification when entering the area. This way the reliability of the physical access system is increasing the possibilities of achieving a high reliability in the registration of the identification profiles on the list of persons tracked in the area. The registration of an identification profile is performed in connection to the person entering the defined area which gives the advantage of having the list of tracked persons assembled before an object, which might correspond to the person entering the area, is detected in received images. This will reduce the processing time and performance needed for each detected object in received images.

In further embodiments, the step of comparing the created set of identification characteristics to the registered identification profiles is performed by calculating confidence scores based on the correlation between the created identification profile and the registered identification profiles, and the step of determining the identification profile that best match the created set of identification characteristics is performed by selecting the identification profile corresponding to the confidence score representing the highest correlation with the created set of identification characteristics. An advantage with using confidence scores to determine the highest correlation is that it quantifies the correlation in a processing efficient way.

In yet further embodiments, the act of connecting is not performed if the calculated confidence score corresponding to the identification profile with the highest correlation to the set of identification characteristics of the detected object is smaller than a first predetermined threshold. This makes it possible to sort out the cases where a poor correlation is the best correlation and preventing the poor correlation from affecting the tracking.

In other embodiments, this is further developed generating an alert if the calculated confidence score corresponding to the identification profile with the highest correlation to the set of identification characteristics of the detected object is smaller than the first predetermined threshold. As the poor match may be due to a detected intruder, that has entered the defined area without proper identification using valid credentials and hence is not part of the list of persons tracked in the area, generating an alert will improve the security of the defined area.

In further embodiments, additional steps of identifying a person leaving the defined area by matching credentials presented by the person to credentials in a database including credentials of preregistered persons, and removing the identification profile of the identified person leaving the defined area from the list of persons that are tracked in the area are introduced. These embodiments will add to keeping the list of persons tracked in the area updated and removing persons leaving the defined area will reduce the list of candidates and hence reduce the processing time and at the same time increase the reliability of the tracking.

In yet further embodiments, the identification profile of a person is removed from the list of persons tracked in the area if a predetermined activity time period has passed since the last point in time a detected object was connected to the identification profile. These embodiments alternatively or in combination with what has previously been described add to keeping the list of persons tracked in the area updated. These embodiments will reduce the list of candidates and hence reduce the processing time.

In further embodiments, a step of registering the identification profile of the identified person in a list of persons that have entered the area is added to the method. The addition of another list including persons that have entered the area is advantageous in that the processing time and resources may be reduced in the majority of cases when the tracking method is used, as only the most likely candidates are on the list of persons tracked in the area, but in the rare cases that one of the most likely candidates does not generate a match with good enough correlation the list of persons that has entered the area will offer the possibility to also compare the identification characteristics with the identification profiles of persons that has entered the area but has not been connected to a detected object in recent time.

This is further developed in yet other embodiments wherein if the calculated confidence score corresponding to the identification profile with the highest correlation to the set of identification characteristics of the detected object in the received image data is smaller than a second predetermined threshold, the act of connecting is not performed, and the method is further comprising, comparing the created set of identification characteristics of the detected object in the received image data to the registered identification profiles in the list of persons that have entered the area, determining the identification profile in the list of persons that have entered the area that best match the set of identification characteristics of the detected object in the received image data, and connecting the detected object in the received image data to the determined identification profile that best match the set of identification characteristics of the detected object in the received image data.

This offers the possibility of matching candidates in a list of persons that has entered the area if the confidence score of the match with the highest correlation is not good enough with a candidate from the list of persons tracked in the area. This further adds to the reliability of the system.

In further embodiments, the comparison of the created set of identification characteristics of the detected object in the received image data to the registered identification profiles in list of persons that have entered the area is performed by calculating confidence scores based on the correlation between the created set of identification characteristics of the detected object in the received image data and the identification profile of the persons in the list of persons that have entered the area, and the determination of the identification profile in the list of persons that have entered the area that best match the created set of identification characteristics is performed by selecting the identification profile corresponding to the confidence score representing the highest correlation with the created set of identification characteristics of the detected object in the received image data. An advantage with using confidence scores to determine the highest correlation is that it quantifies the correlation in a processing efficient way.

In yet other embodiments, the identification profile comprises one or more sets of identification characteristics for describing the appearance of a person, selected from the group consisting of: characteristic geometrical parameters of the body or the face of a person, mathematical expressions representing facial features or features of the body of a person, texture parameters of a person's clothing, skin or face, color spectrum from the image of a person or part of a person, gait of a person, a movement pattern of a person. The identification characteristics for describing the appearance of a person further adds to the processing efficiency and reliability of the method for tracking as it offers ways to calculate and process appearance features.

In another embodiment, the information in the identification profile that best match the set of identification characteristics of the detected object is updated with information from the created set of identification characteristics. This offers the advantage of continuously updating the identification characteristics, being important for the reliability of the tracking as the visual appearance of person may be easily modified in a short period of time. For example, clothing might change if a person takes off a coat, wears glasses or not, has shaved off the beard etc.

In yet other embodiments, the act of updating the information in the identification profile is performed by calculating a statistical measure based on the present information in the identification profile and information from the created set of identification characteristics. This further adds a processing efficient way of updating the identification profile.

In yet further embodiments, the step of connecting the detected object to the determined identification profile that best match the set of identification characteristics of the detected object further is comprising registering information related to the image data selected from the group of an identifier of the image acquisition device that acquired the image data, the point in time in which the image data was acquired by the image acquisition device and the position of the image acquisition device that acquired the image data. This adds the advantage of having additional information concerning the location, image acquisition device and/or point in time of the object detection, which improves the confidence of making the correct identification and hence the object tracking ability in the defined area.

A second aspect relates to a computer program product comprising a computer-readable storage medium with instructions adapted to carry out the method described in connection to the first aspect when executed by a processor. The computer-readable storage medium may be a non-transitory computer-readable storage medium. Advantages corresponding to the first aspect are also applicable for this second aspect.

A third aspect relates to a system for tracking a person comprising an identification module arranged to identify a person entering a defined area by matching credentials presented by the person to credentials in an database including credentials of preregistered persons, a registration module arranged to register an identification profile of a person in a list of persons that are tracked in the area, the identification profile comprising information for identifying the person, an image acquisition device arranged to acquire image data from a scene within the area, an identification characteristics creation module arranged to create a set of identification characteristics for an object detected in image data acquired by the image acquisition device, a matching module arranged to compare a created set of identification characteristics of a detected object to the registered identification profiles in the list of persons that are tracked in the area and determine the identification profile in the list of persons that are tracked in the area that best match the set of identification characteristics of the detected object, and a tracking module arranged to connect the detected object to the determined identification profile that best match the identification profile of the detected object. Advantages corresponding to the first aspect are also applicable for this third aspect.

According to further embodiments of the third aspect, the system is further comprising an entrance registration module arranged to register an identification profile of a person in a list of persons that have entered the area, the identification profile comprising information for identifying the person from image data, a deregistration module arranged to deregister the identification profile of a person from the list of persons tracked in the area if a predetermined activity time period has passed since the last point in time a detected object was connected to the identification profile, a matching module arranged to compare a created set of identification characteristics of a detected object in image data to the registered identification profiles in the list of persons tracked in the area and determine the identification profile in the list of persons tracked in the area that best match the set of identification characteristics of the detected object in image data.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description. Hence, it is to be understood that these teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an," "the", and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

A tracking method and system according to one embodiment may be applied to a camera system monitoring a defined area such as an office complex, a factory, a hotel, a gated community, a campus, or a premises where persons preregister to get access credentials. In this detailed description a defined area is an area to which entrance is controlled by a physical access control system.

There are different approaches for tracking an object known in the art, one of which is based on detecting a target object and matching features of the target object with features of stored candidate objects to find the best match are essential steps of a tracking method. The number of candidate objects to a defined area may be large. In the example of a defined area being a factory it is of course the people working in the factory, there may for example be different teams working in shift, persons delivering goods to the factory and transportation personnel for delivering products from the factory, temporary visitors, various service personnel, security personnel etc. In addition to the fact that the number of candidate objects in a defined area such in the example above is large, the number of concurrent target objects in the area may also be high, in particular during specific time periods. An example of where and when there are a larger number of concurrent objects is in a factory when one team of workers are finishing a shift and another team of workers is starting their shift. A tracking system connected to the cameras monitoring a defined area hence needs to be able to manage both a large number of candidate objects and a large number of concurrent target objects. The large number of candidate objects implying that a lot of processing will be needed for each detected target object and a large number of detected target objects meaning that this processing will be needed to be performed frequently.

Figure 1:
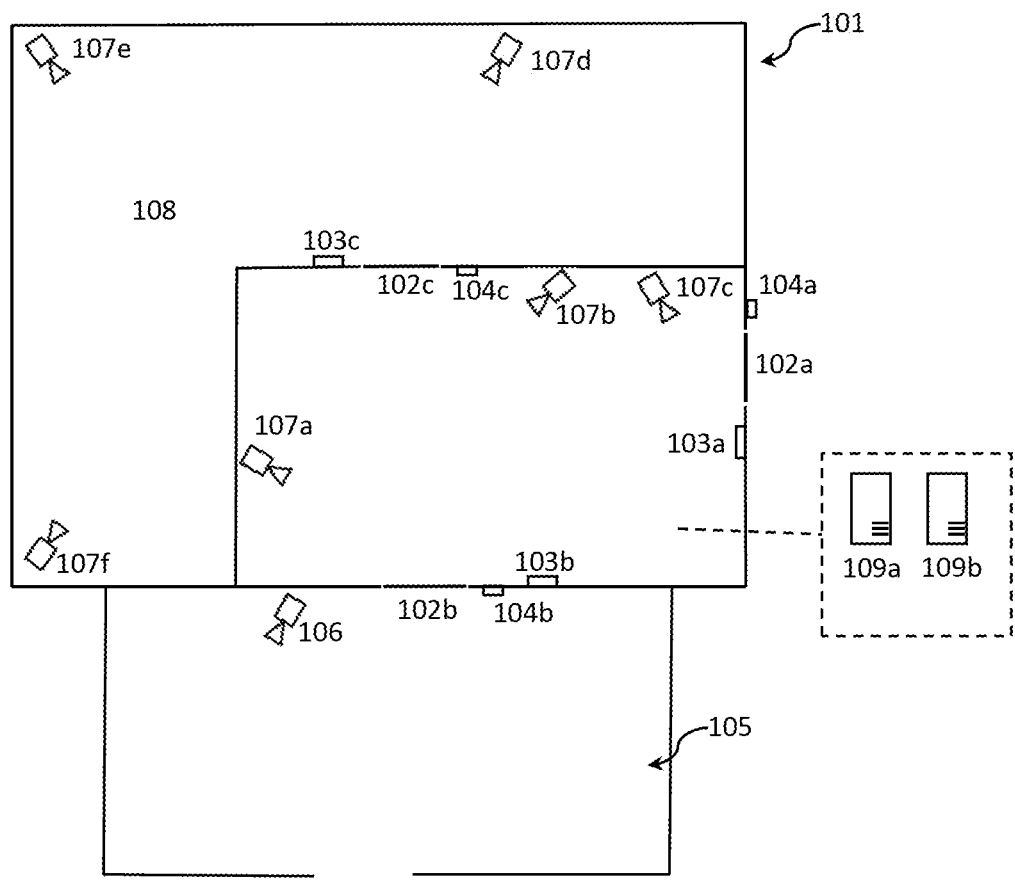
FIG. 1 illustrates an example of a defined area 101.

An example of a system according to one embodiment is depicted in FIG. 1. The defined area 101 is accessed through entrance(s) 102a, 102b which are controlled by physical access controllers 103a, 103b. The physical access controllers 103a, 103b are part of a physical access control system adapted to control physical access to the defined area by matching credentials presented by a person requesting access to the defined area 101 to credentials in a database including credentials of preregistered persons. Such physical access control systems may be used at factories, offices, schools, laboratories, hotels etc. where access to certain areas are restricted to a specified group of persons that have been preregistered. The matching of the credentials as well as the storage of the credential database may be handled locally on the access controller 103a, 103b or at a server 109a connected to the access controllers 103a, 103b. In FIG. 1 the server 109a is placed in box with dashed lines outside, but connected to, the defined area 101. The purpose of this representation of the server 109a is to show that the server may be physically located within the defined area 101 or outside the defined area, in case the server 109a is located outside the defined area 101 it would be connected to the access controllers 103a, 103b through a network. The access controllers 103a, 103b are connected to a credential input device 104a, 104b, for example a keypad, a biometric scanner, or a reader device for optical, magnetic or radio-frequency protocols, or similar device for a person, requesting access to the defined area, to present credentials. The biometric scanner may for example scan fingerprints, irises, retinas or faces. The physical access controllers 103a, 103b are connected to a locking mechanism governing entry to the defined area 101, e.g. via a door, an elevator, a gate, a turnstile, a sliding door, or another movable blocking device that may be put in a passage to prevent people from entering the defined area 101 without presenting their credentials. Depending on the success of matching presented credentials with the credentials in the credential database, and various access rules, a person may be given access to the defined area. An access rule may for example regulate time periods during which access will be granted to preregistered persons.

An entrance 102b may be located in connection to a registration area 105 where a person about to request access to the defined area 101 may preregister in order to get credentials for accessing the defined area 101.

A camera 106 may be used for capturing images of the person for the preregistration. The captured images may be used for compiling an identification profile comprising information for identifying the person from image data. The identification profile comprises one or more sets of identification characteristics for describing the appearance of a person. Examples of identification characteristics are characteristic geometrical parameters of the body or the face of a person, mathematical expressions representing facial features or features of the body of a person, texture parameters of a person's clothing, skin or face, colour spectrum from the image of a person or part of a person, gait of a person, a movement pattern of a person. In addition to identification characteristics for describing the appearance of a person the identification profile could also comprise other descriptors of the person, e.g. earlier determined positions of a person within the defined area, or identifiers transmitted from various mobile devices carried by the person. The compilation of an identification profile may or may not be a part of the preregistration process. Alternatively, the identification profile may be compiled using image data from cameras 107 a-f monitoring the defined area 101, after the person has entered the defined area 101. Image data used in the identification profile may also be collected partly during the preregistration and partly in a defined area 101. Yet another alternative is to import identification profiles or data that could be used to compile an identification profile from another source, such as another monitoring system.

The identification profile may also be continuously updated with image data from cameras 107 a-f monitoring a defined area 101. Continuously updating the identification profile may be useful as at least some of the data relating to the appearance of a person might change over time, like for example clothing, glasses, haircuts etc.

Preregistration may be performed in other locations than in the above discussed registration area 105. The preregistration may for example be performed in other registration areas located remote from the defined area 101. A designated registration area may not even be needed as long as the credentials to be used when requesting access to the defined area may be transmitted and inserted into the credential database of the physical access control system controlling access to the defined area 101.

A second defined area 108 may also be located inside the defined area 101, so that a person first needs to request access to the defined area 101 before entering the second defined area 108. Access rules may be defined in the physical access control system so that all persons having access to the first part of the defined area 101 may also access the second defined area 108, access rules may alternatively be configured so that a subgroup of the persons that may enter the first part of the defined area 101 also can enter the second defined area 108. The second defined area 108 is accessed through entrance 102c which are controlled by physical access controller 103c. The physical access controller 103c is part of the physical access control system adapted to control physical access to the defined area by matching credentials presented by a person requesting access to the defined area to credentials in a database including credentials of preregistered persons. The matching of the credentials as well as the storage of the credential database may be handled locally on the access controller 103c or at a server connected to the access controllers, as for access controllers 103a-b. The access controller 103c is also connected to a credential input device 104c, similar to what has been previously explained for credential input devices 104 a-b.

A plurality of monitoring cameras 107a-f are monitoring the defined area 101. The monitoring cameras 107 a-f may monitor the entrances 102 a-b to the first part of the defined area 101 as well as the entrances to a second defined area 108 located inside defined area 101 and also other areas within the defined areas. The monitoring cameras 107a-f are connected to a monitoring system that may also include a server 109b for storing, processing and managing image data. The monitoring system may also include local computational devices serving nearby monitoring cameras 107a-f. The devices connected to the monitoring system are communicating via a network, the network may be any kind of communication network, such as a wire line or wireless data communication network, e.g. a local area network (LAN) or a wireless local area network (W-LAN) or a Wide Area Network (WAN). The monitoring cameras 107a-f may be any digital video cameras capable of generating image sequences and/or any analog video cameras capable of generating image sequences. In the case of a monitoring camera being an analog video camera the analog video camera is connected to a converter transforming the analog image information to digital image data and providing the digital image data to the network 20. Such a converter might be a video encoder or a video server. In FIG. 1 the server 109b is placed in box with dashed lines outside, but connected to, the defined area 101. The purpose of this representation of the server 109b is, as mentioned previously, to show that the server may be physically located within the defined area 101 or outside the defined area, in case the server 109b is located outside the defined area 101 it would be connected to the monitoring cameras 107a-f through the network. Alternatively the monitoring cameras 107 a-f may be equipped to handle storage, processing and management of image data locally or by using a local computational device serving nearby monitoring cameras 107 a-f. The monitoring system handles the stored identification profiles and manages object tracking of objects in image data acquired by the monitoring cameras. The monitoring system is connected to the physical access control system. The servers 109a and 109b are in FIG. 1 drawn as separate units but the functionality of server 109a and 109b may of course be combined on one physical server unit.

Figure 2:
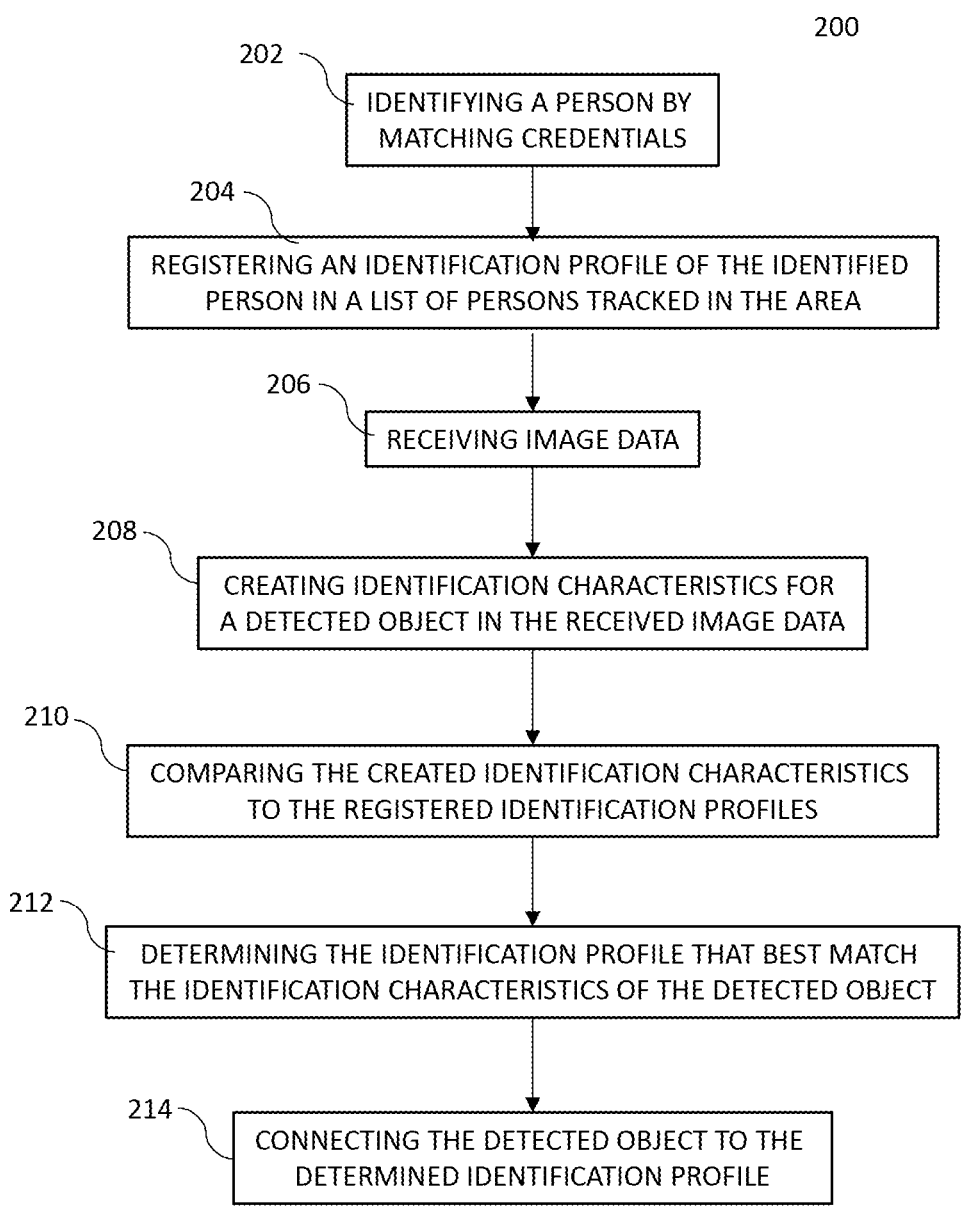
FIG. 2 is a block scheme of a method for tracking an object.

Now referring to FIG. 2, a method for tracking a person in a defined area 101, such as the one depicted in FIG. 1, is described. The method starts by identifying a person entering a defined area, step 202. The identification is performed by matching credentials presented to the system by the person to credentials in a database including credentials of preregistered persons. Step 202 may be performed by the physical access control system described in connection to FIG. 1, for example comprising a credential input device 104 for reading the credential presented by the person and an access controller 103 matching the presented credentials to credentials in a database including credentials of preregistered persons. The access controller 103 could however as an alternative transmit the presented credentials to a central server 109a, performing the matching of the presented credentials with credentials of preregistered persons.

After the step 202, of identifying a person entering the defined area 101, an identification profile of the identified person is registered in a list of persons that are tracked in the area 405 (step 204). There are various alternatives for performing step 204, if an identification profile for the identified person is available for the monitoring system the identification profile may be labelled as "tracked" or similar. A pointer to the identification profile in question may alternatively be generated from a list of persons that are tracked in the area 405, of course the identification profile may also by copied to designated memory for the list of persons that are tracked in the area 405. If an identification profile of the identified person is not available for the monitoring system a new identification profile may be generated from image data captured by monitoring cameras 107 monitoring the defined area 101. As an example a monitoring camera 107c monitoring the entrance 102a to the defined area 101 may be used to capture image data from which identification characteristics for describing the appearance of the identified person may be extracted and registered in an identification profile. Image data captured by monitoring cameras 107c monitoring the entrance 102a to the defined area 101 may also be useful for updating available identification profiles with identification characteristics describing the current appearance of the identified person. The advantage of using image data captured by a monitoring camera 107c monitoring the entrance 102a to the defined area 101 for updating the identification profile is that it is performed when, or shortly after, the person has been identified by presenting and matching credentials, implying that a positive identification of the person has been made with enough confidence to let the person in to the defined area. If the person for example has a new haircut, new pair of glasses, or simply a new outfit changing the appearance of the person the identification profile may be adapted for this at a point in the system where the identification of the person is known from the presented credentials.

The tracking method then continues with receiving image data (step 206) from a scene within the area. The received image data is captured by any of the monitoring cameras 107 monitoring the defined area 101. An object may be detected in the received image data by any object detection algorithm known in the art. Moving objects may for example be detected by means of motion detection algorithms. Some examples of motion detection algorithms are change detection algorithms comparing video frames and detecting changes between the video frames, algorithms using background models of the monitored scene to extract moving foreground objects, spatio-temporal algorithms such as described in U.S. Pat. No. 8,121,424 by Almbladh or any combination of these. An example of an alternative to detecting objects by their motion is to detect the objects by their visual features, using shape detection. There are various types of such object detection methods known in the art where cascades of identifiers are used to detect objects, e.g. as described in Viola, Paul, and Michael Jones. "Rapid object detection using a boosted cascade of simple features." Computer Vision and Pattern Recognition, 2001. CVPR 2001. Proceedings of the 2001 IEEE Computer Society Conference on. Vol. 1. IEEE, 2001. Since it is the visual features that are important for these algorithms groups of objects that share similar visual features may be detected, examples of such groups are faces, vehicles, humans etc. Any of these methods may be used separately or in combination to detect an object in image data. Several objects may also be detected in the same set of image data. The object detection may be performed at the monitoring cameras 107, either by the monitoring camera that captured the image data or another monitoring camera that received the imaged data from a monitoring camera that captured the image data. Alternatively, the object detection may be performed at a server 109b connected to the monitoring cameras 107 in the monitoring system or at a local computational device serving nearby monitoring cameras 107.

When an object has been detected in the image data a set of identification characteristics is created to describe the visual appearance of the detected object, step 208. Image data from a single image frame or a video sequence captured by one or more monitoring cameras 107 monitoring the defined area 101 may be used to create the identification characteristics for the detected object. Various image and/or video analysis algorithms may be used to extract and create the identification characteristics from the image data. Examples of such image or video analysis algorithms are various algorithms e.g. for extracting features in a face such in Turk, Matthew A., and Alex P. Pentland. "Face recognition using eigenfaces." Computer Vision and Pattern Recognition, 1991. Proceedings CVPR'91, IEEE Computer Society Conference on. IEEE, 1991, gait features such in Lee, Lily, and W. Eric L. Grimson. "Gait analysis for recognition and classification." Automatic Face and Gesture Recognition, 2002. Proceedings. Fifth IEEE International Conference on. IEEE, 2002, or colors such in U.S. Pat. No. 8,472,714 by Brogren et al.

The identification characteristics may be created at the monitoring camera that captured the image data, another monitoring camera in the monitoring system, at a local computational unit serving nearby cameras or at a server 109b connected to the monitoring cameras. The creation of the identification characteristics is made in response to an object being detected in the received image data. If the object is detected in one part of the system and the creation of the identification characteristics is to be performed in another part of the system, data describing the detected object in the image data may be transmitted from the part detecting the object to the part that is to create identification characteristics. Examples of such data describing the detected component in the image data may be image coordinates, time stamp, object label, colour identifiers, image of the object etc. This will enable the receiving part to continue the method of tracking the object with creating identification characteristics of the detected object.

The created identification characteristics are then stored for the detected object and compared to the identification characteristics in the registered identification profiles in the list of persons that are tracked in the area 405 (step 210). By keeping a list of persons that are tracked in the area 405 there is no need to compare the created identification characteristics of the detected object to the complete list of persons that have the possibility to be in the defined area, e.g. all employees at a manufacturing facility, all persons working at an office, all persons living at a gated community etc. This results in that the accuracy in of the identification is improved, that a lot of processing power and processing time is saved and that the actual processing may be performed at a component of the system with limited processing power and time. Due to the fact that the persons on the list of persons that are tracked in the area 405 are registered and there by entered to the list in response to entering the defined area no time or processing power is needed to assemble the list as a part of step 210 where the comparison is made. It is likely to assume that the comparison step 210 is made more frequently by the system than the identification and registration steps 202 and 204 as persons that have entered the defined area 101 are likely to move around the defined area 101 and may be detected in image data captured by monitoring cameras 107 at many locations within the defined area. The processing associated with assembling the list will hence also be reduced by registering the identified persons entering the defined area 101 in response to identification, step 202.

In step 212 the identification profile in the list of persons that are tracked in the area 405 that best match the set of identification characteristics of the detected object is determined. This may be performed by calculating confidences scores describing how well the identification characteristics in the identification profile match the created identification characteristics of the detected object. The confidence score may for example be defined as a percentage where 100%, or 1, denotes an identical match of identification characteristics and 0%, or 0, denotes two completely different identification characteristics. The matching of identification characteristics may be difficult to perform as the image data being used as a basis for the match is susceptible to lighting conditions, image processing artifacts, performance of the monitoring cameras etc. In order to increase the reliability of the match several different identification characteristics may be used in parallel and a combined result may be used. A neural network approach may be used to determine the identification profile that best match the created identification characteristics of the detected object. A neural network would then be trained to find the best match with the highest correlation between identification profiles and identification characteristics of a detected object, and be implemented on a server 109*a-b* or distributed over the monitoring cameras 107 or over local computational units connected to the monitoring cameras. Based on the experiences of the training, the neural network would then use the combination of identification characteristic(s) that would be most efficient in reaching the best match. Some identification characteristics may hence not be used in such a scenario, if they would not be efficient in finding the best match. The efficiency in finding a match may for example refer to the success of actually finding the best match, the resources needed to find the best match, the time it would take to find the best match or the processing power needed to find the best match. A neural network may be implemented to use one, or a combination, of possible approaches for performing the matching. There are different matching approaches known in the art, e.g. the Euclidean distance between the identification characteristics of a detected object and the identification characteristics of an identification profile may be used in the matching as by Schroff et al in "Facenet: A unified embedding for face recognition and clustering." Proceedings of the IEEE Conference on Computer Vision and Pattern Recognition. 2015. An alternative is to apply algorithms based on feature cascades such as the one disclosed by Viola and Jones in "Rapid object detection using a boosted cascade of simple features." Computer Vision and Pattern Recognition, 2001. CVPR 2001. Proceedings of the 2001 IEEE Computer Society Conference on. Vol. 1. IEEE, 2001. In the case of using the Euclidean distance approach a short Euclidean distance would represent a high correlation while a large Euclidean distance would represent a low correlation between the identification characteristics.

In step 214 the detected object is connected to the determined identification profile that best match the identification profile of the detected object. The connection may be implemented as reference, tag or pointer saved as metadata connected to the image frame in which the object was detected. Alternatively, or in combination a reference, tag or pointer to the video frame or sequence of video frames or alternatively the point in time, or time interval, and location of the scene or camera which captured the images of the detected object may be stored in the identification profile that was determined to best match the identification characteristics of the detected object.

In addition to using the confidence scores for finding the best match of the identification characteristics they may also be used as indication of that the best match is in fact a poor match. If the calculated confidence score corresponding to the identification profile with the highest correlation to the set of identification characteristics of the detected object is smaller than a first predetermined threshold the act of connecting the detected object to the identification profile that generates the best match may not be performed. This will prevent the system from storing results that may be misleading. An alert may also be generated and transmitted to an operator of the system in such cases. It may be critical that these cases of matches with poor correlation are highlighted as a poor match as it may be an indication that a person not being permitted to access to the defined area 101 has gained access to the defined area 101 anyway.

In order to keep the list of persons that are tracked in the area 405 up to date and accurate persons that are identified as leaving the defined area 101 may be removed from this list. Persons may be identified as leaving the defined area 101 by presenting credentials in order to open e.g. a door enabling them to leave the defined area 101. The presented credentials can then be matched to the credentials in a database including credentials of preregistered persons to find their identity, and removing their identification profile from the list of persons that are tracked in the area 405.

Identification profiles that has not been connected to a detected object during a predetermined activity time period may also be removed from the list of persons that are tracked in the area 405. So if a person that has entered the defined area 101 stays at a location with no monitoring within the defined area 101 or leaves the defined area 101 without being identified as leaving the defined area 101, that person would be removed from the list of persons that are tracked in the area 405 after the predetermined activity time period has passed since the identification profile of the person was last connected to a detected object. This feature may be implemented to keep the list of persons that are tracked in the area 405 accurate and not including more persons than necessary, to reduce the processing time of the tracking and increase the identification accuracy. The range of the predetermined activity time period may vary from system to system. In a defined area 101 where a lot of people are moving around frequently and it is difficult to identify persons leaving the area it may be wise to set this time period to be quite short. In a system where only a few people are expected to move around and maybe stay at places not being monitored within the defined area 101 for a longer period of time, like for example in a hotel, this predetermined activity time period would typically be set to a longer time period.

Figure 3:
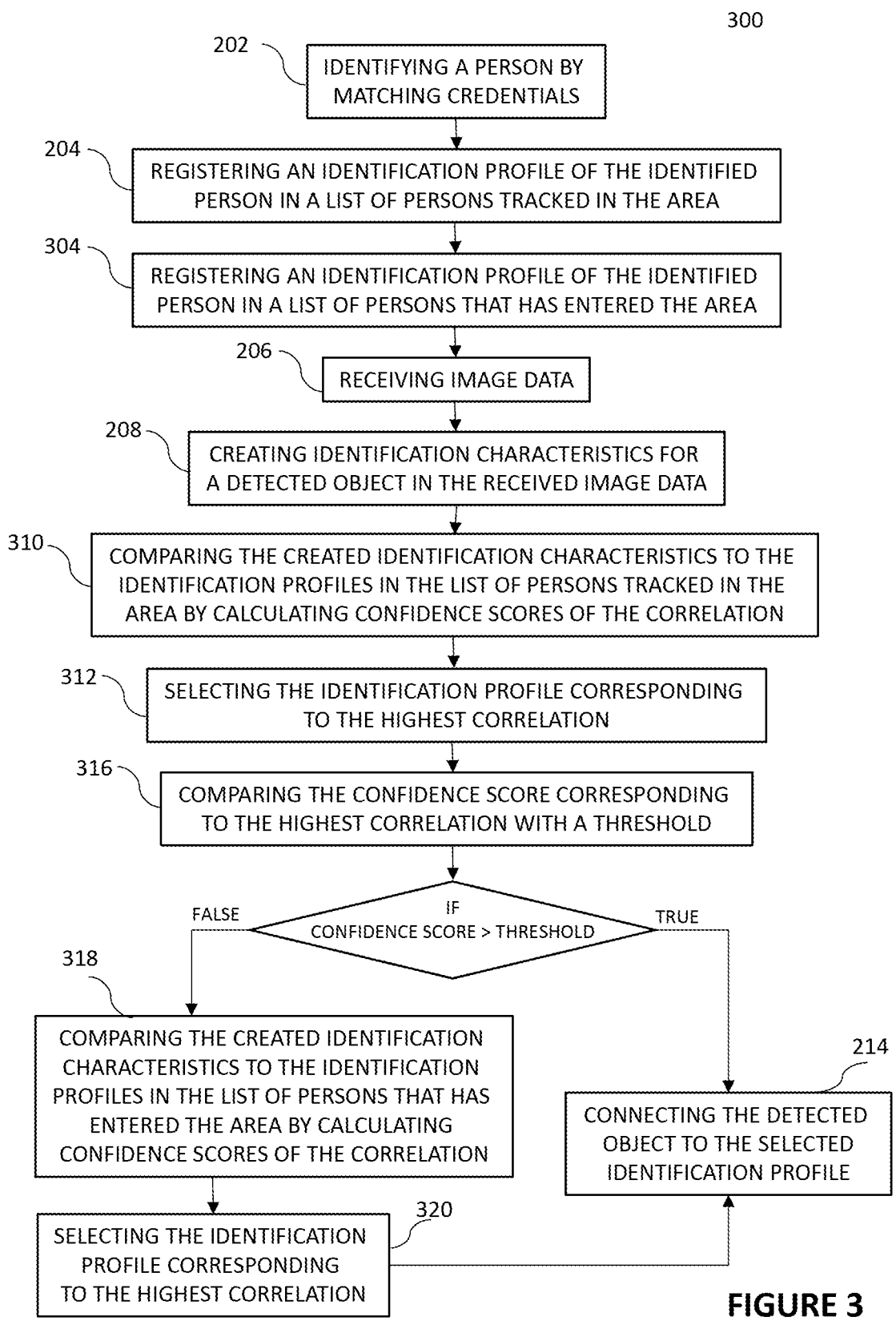
FIG. 3 is a block scheme of an alternative method for tracking an object.

In FIG. 3, an alternative method for tracking a person is displayed. This method is based on the method described with reference to FIG. 2 and have some of the steps in common with that method, the common steps are denoted with the same reference numbers for simplicity.

The tracking method of FIG. 3 starts with identifying a person by matching credentials, step 202, and registering an identification profile of the identified person in a list of persons tracked in the area 405, step 204. Both step 202 and step 204 have been discussed earlier with reference to FIG. 2. The identification profile is however also registered in a list of persons that has entered the area 505, step 304. The list of persons that has entered the area 505 comprises identification profiles of all persons that has been identified as entered the area. To keep the list accurate, persons that are identified as leaving the area may be removed from the list. Similar to the tracking method displayed in FIG. 2 image data is received in step 206 and identification characteristics for a detected object in the received image data is created in step 208. In step 310 the created identification characteristics are then compared to the identification profiles in the list of persons tracked in the area 405 by calculating confidence scores of the correlation between the created identification characteristics and the corresponding identification characteristics of the identification profiles. Confidence scores have been discussed earlier and that discussion also applies to the confidence scores calculated in step 310. The identification profile that has the highest correlation with the created identification characteristics of the detected object and thereby generates the highest confidence scores is selected in step 213. In order to examine the quality of the match between the created identification characteristics and the identification profile with the highest correlation the confidence score associated highest correlation is compared with a threshold in step 316. If the confidence score is larger than this threshold the match between the created identification characteristics and the identification profile has a good enough quality to continue to step 214 where the detected object is connected to the identification profile.

But if the confidence score is not larger than the threshold, this indicates that the match between the created identification characteristics and the identification profile has poor correlation. This could typically be the case when a person that has been removed from the list of persons that are tracked in the area 405 has started to move in the monitored part of the area again. Poor correlation could also indicate that a person has entered the area without presenting credentials.

The created identification characteristics are then compared to the identification profiles in the list of persons that has entered the area 505 by calculating confidence scores of the correlation between the created identification characteristics and the corresponding identification characteristics of the identification profiles, see step 318. Similar to step 312, the identification profile corresponding to the highest correlation is then selected in step 320 and connected to the detected object in step 214. If the calculated confidence score corresponding to the identification profile with the highest correlation to the set of identification characteristics of the detected object is smaller than a second predetermined threshold the act of connecting the detected object to the identification profile that generates the best match may not be performed. This will prevent the system from storing results that may be misleading. An alert may also be generated and transmitted to an operator of the system in such cases. It may be critical that these cases of matches with poor correlation are highlighted as a poor match as it may be an indication that a person not being permitted to access to the defined area 101 has gained access to the defined area 101 anyway.

The list of persons tracked in the area 405 comprises a subset of the list of persons that has entered the area 505. The list of persons tracked in the area 405 are hence a list of persons that has entered the area and that are also presently being tracked or at least was connected to a detected object in recent time. This may be realized by using the earlier mentioned predetermined activity time period to remove identification profiles from the list of person tracked in the area which have not been connected to a detected object for a specific time period. The list of persons tracked in the area 405 will hence comprise the most likely candidates for a match with high correlation when an object is detected in image data. Processing time and resources will hence be reduced in the majority of cases when the tracking method is used as only the most likely candidates are used in the comparison step 310 and in the rare cases that one of the most likely candidates does not generate a match with good enough correlation a second comparison step 318 will offer the possibility to also compare the identification characteristics with the identification profiles of persons that has entered the area but has not been connected to a detected object in recent time. So if a person enters a defined area 101 but then for example stays in a room not monitored by any of the monitoring cameras 107 for a time period longer than the predetermined activity time period the identification profile of that person may be removed from the list of persons that are tracked in the area 405 but as the person still will be on the list of persons that entered the area 505 the identification profile of that person may be selected when the person left the unmonitored room and was detected by a monitoring camera.

In such a case when an identification profile has been removed from the list of persons tracked in the area 405 the identification profile could also be registered on the list of persons tracked in the area 405 again in response to the step 214 of connecting a detected object to the identification profile in question.

Due to the fact that the list of persons tracked in the area 405 comprises a subset of the list of persons that has entered the area 505, confidence scores may not need to be recalculated for the identification profiles in the list of persons tracked in the area 405 in step 318. The confidence scores calculated for these identification profiles in step 310 may be reused in step 318 or it may be decided that these identification profiles are not included in the comparison performed in step 318.

Identification profiles of persons that have entered the area may also be removed from that list if a predetermined presence time period has passed since the point in time when the person was identified to enter the area. This would be useful in keeping the list of persons that have entered the area 505 up to date and accurate as there may be a possibility for persons to leave the defined area without being identified as leaving the area. The predetermined presence time period would typically be set to a time period that is longer than the expected presence time within the defined area. For example, if the defined area was an office complex this time period could set to the expected working time with some safety margin.

In response to step 214 of connecting the detected object to the selected identification profile the selected identification profile may be updated with the data from the created identification characteristics of the detected object. As an alternative the updating of the identification profile may only be made if the correlation of the match is high enough, by for example comparing the confidence score to a predetermined threshold for updating. One way of performing the update may be to calculate a statistical measure based on the present information in the identification profile and information from the created set of identification characteristics.

In connection to FIG. 4 a system 400 for tracking a person will be discussed. The system 400 for tracking a person comprises an identification module 402 arranged to identify a person entering a defined area by matching credentials presented by the person to credentials in an database including credentials of preregistered persons, a registration module 404 arranged to register an identification profile of a person in a list of persons that are tracked in the area 405, the identification profile comprising information for identifying the person, an image acquisition device 406 arranged to acquire image data from a scene within the area, an identification characteristics creation module 408 arranged to create a set of identification characteristics for an object detected in image data acquired by the image acquisition device, a matching module 410 arranged to compare a created set of identification characteristics of a detected object to the registered identification profiles in the list of persons that are tracked in the area 405 and determine the identification profile in the list of persons that are tracked in the area 405 that best match the set of identification characteristics of the detected object, and a tracking module 412 arranged to connect the detected object to the determined identification profile that best match the identification profile of the detected object.

Figure 4:
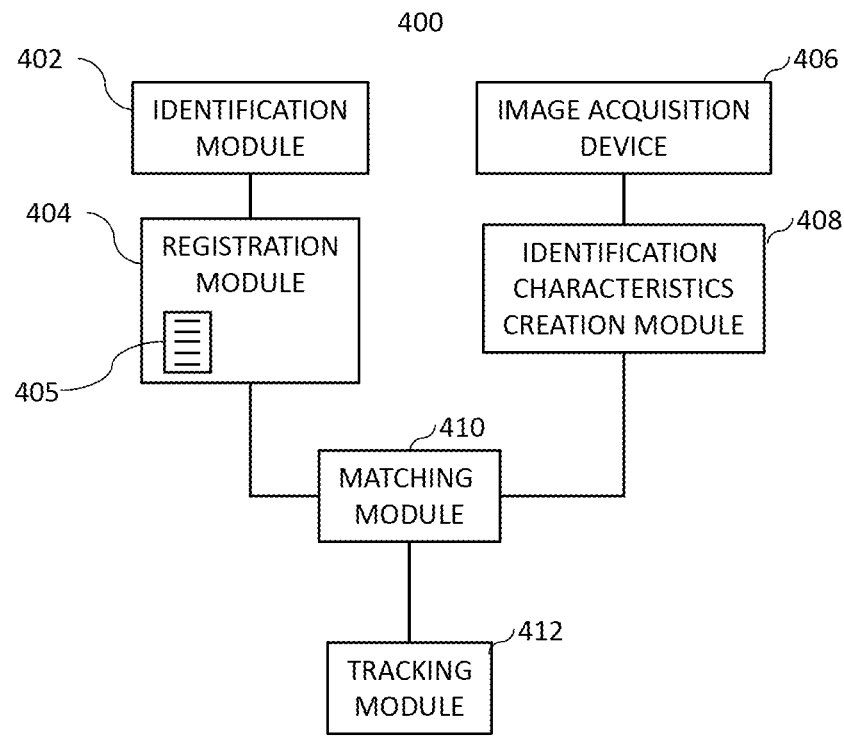
FIG. 4 is a block diagram of a system for tracking an object.

The identification module 402 of FIG. 4 may be implemented on a physical access controller 103a, 103b or on a server connected to the physical access control system, such as server 109a. A central server, such as the 109a or 109b will typically include the functionality of the registration module 404, however the functionality of the registration module could alternatively be distributed on the monitoring cameras 107 or the physical access controllers 103 using peer to peer protocols known in the art. The registration module 404 could also, as yet another alternative, be implemented on local computation unit(s) serving one or more nearby monitoring camera(s) 107. The identification module 402 is connected to the registration module 404 and transmits an identifier of the identified person to the registration module 404 so that the identification profile of the identified person can be registered in the list of persons tracked in the area 405. The registration module 404 stores and handles the communication with regards to the entries of the list of persons tracked in the area 405 in connection to the other modules of system 400 and 500. The registration module 404 may comprise submodules, e.g. one submodule handling the communication with the other modules of the system 400 and 500, and one submodule storing the actual list of persons tracked in the area 405.

Monitoring cameras 107 are examples of an image acquisition device 406 capturing image data from a scene within the defined area 101. The monitoring cameras 107 may also include the identification characteristics creation module or alternatively this module may be located on a central server 109b connected to the monitoring cameras 107. The monitoring cameras will in the latter case transmit image data of the monitored scene or specifically, if object detection is performed at the camera, image data of the detected object, to the central server 109b.

The matching module 410 receives information about the registered identification profiles from the registration module 404 and the created identification characteristics from the identification characteristics creation module 408 in order to make a comparison to find the best match. As what has earlier been described this comparison may be made by calculating and comparing confidence scores. Data identifying the identification profile resulting in the best match will then be transmitted to the tracking module 412 which connects the detected object with this identification profile. The matching module 410 and the tracking module 412 may be implemented on a central server 109, a local computation unit(s) serving the nearby cameras, as distributed functionality on a plurality of monitoring cameras 107 or on physical access control servers 103.

Figure 5:
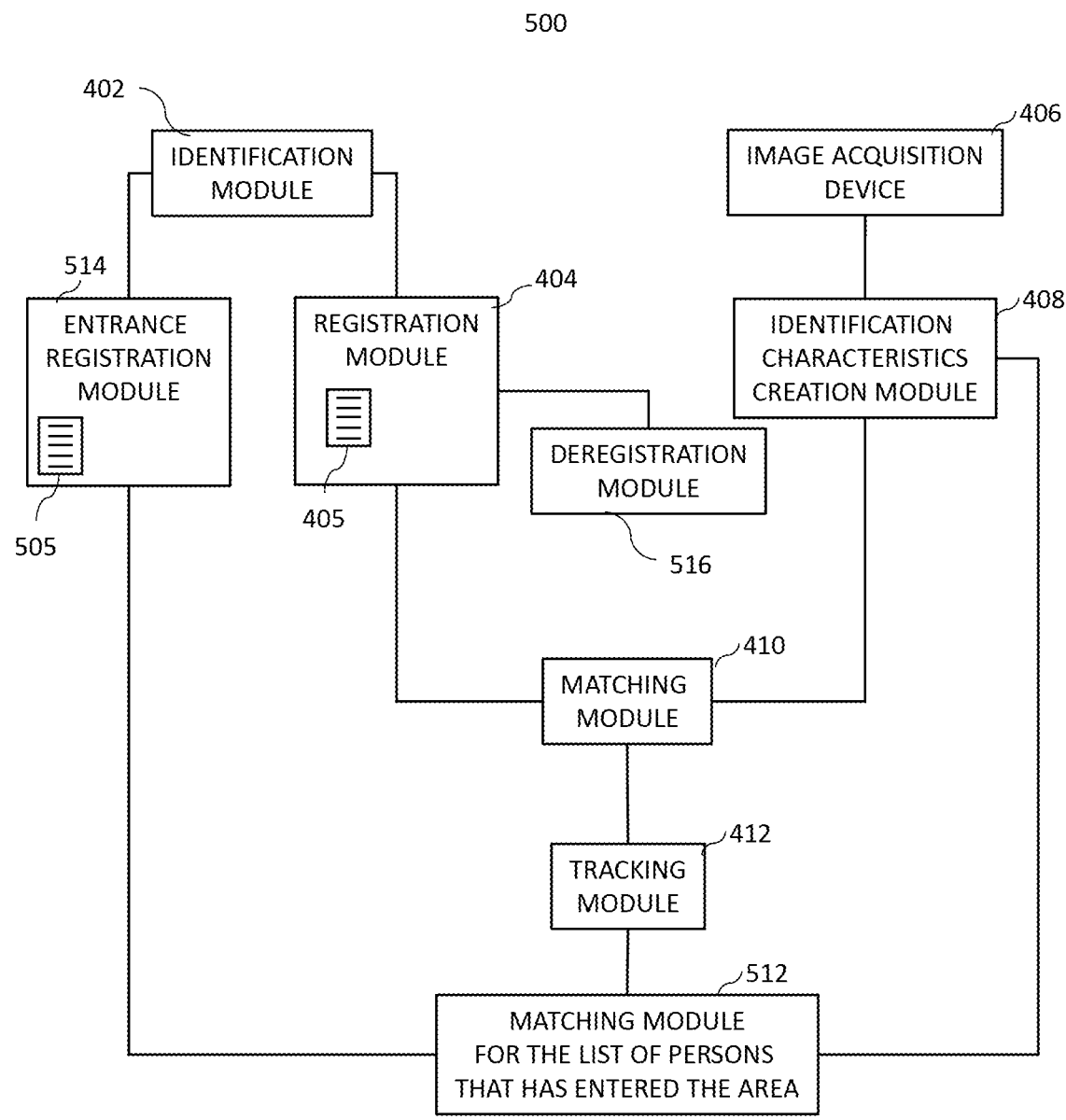
FIG. 5 is a block diagram of an alternative system for tracking an object.

FIG. 5 shows another example of a system 500 for tracking a person. Some of the modules discussed earlier, in connection to system 400, are present in system 500. The description of those modules also apply to system 500.

The entrance registration module 514 registering identification profiles on a list of persons that have entered the area 505 of system 500 can be implemented as part of the physical access control system, e.g. included in a physical access controller 103 or on a central server connected to physical access controllers 103. The entrance registration module 514 stores information, and handles the communication, with regards to the entries of the list of persons that have entered the area 505 in connection to the other modules of system 500. The entrance registration module 514 may comprise submodules, e.g. one submodule handling the communication with the other modules of the system 500, and one submodule storing the actual list of persons that have entered the area 505. In addition to the matching module 410 working with the list of persons tracked in the area 405 a second matching module 512 is included in system 500, matching identification profiles on the list of persons that has entered the area 505. The matching module 512 hence receives information about the registered identification profiles from the entrance registration module 514 and the created identification characteristics from the identification characteristics creation module 408 in order to make a comparison to find the best match.

A deregistration module 516 is connected to the registration module 404 in system 500. The deregistration module 516 is arranged to deregister the identification profile of a person from the list of persons tracked in the area 405 if a predetermined activity time period has passed since the last point in time a detected object was connected to the identification profile and is hence connected to the registration module 404. Similar to the registration module 404 the deregistration module 516 may be implemented on a central server, such as the 109a or 109b. However, the functionality of the deregistration module 516 could alternatively be distributed on the monitoring cameras 107 or on the physical access controllers 103 using peer to peer protocols known in the art. Another alternative is to implement the deregistration module 516 on local computation unit(s) serving one or more nearby monitoring camera(s) 107.

Furthermore, the system and method may take the form of a non-transitory computer program product embodied in one or more computer readable medium(s) having computer readable program code embodied thereon.

The physical access control system and monitoring system may be further connected to a video management system, a so called VMS. In general a video management system manages monitoring cameras and video generated by the monitoring cameras but could also be extended to further manage a physical access control system. An operator interfacing with the VMS could hence also configure the system for tracking an object. The mentioned thresholds for confidence scores could for example be configured by the operator using the VMS interface. The presence and activity time periods could similarly be configured using the VMS.

The connections made between the detected objects and the identification profiles could also be used by the VMS to gather for example image data and physical coordinates of an object specified by the operator. From the gathered image data and physical coordinates visual illustrations as well as statistics may be extracted for the use of the operator. This type of object tracking searches could be performed both using recorded material in a so called forensic video search as well as using live data.

What is claimed is:

1. A method for tracking a person, comprising:
   identifying the person entering a defined area by reading credentials presented by the person when requesting access to the defined area and matching the credentials presented by the person to credentials in a database including credentials of preregistered persons,
   registering an identification profile of the identified person in a list of persons that are currently tracked in the defined area, the identification profile comprising a set of identification characteristics describing the appearance of the person;
   receiving image data from a scene within the defined area, creating a set of identification characteristics for an object detected in the received image data;
   comparing the created set of identification characteristics of the detected object to sets of identification characteristics of registered identification profiles in the list of persons that are currently tracked in the defined area;
   determining an identification profile in the list of persons that are currently tracked in the defined area that comprises a set of identification characteristics that best match the created set of identification characteristics of the detected object; and
   connecting the detected object to the determined identification profile comprising the set of identification characteristics that best match the created set of identification characteristics of the detected object.

2. The method according to claim 1, wherein the comparison of the created set of identification characteristics of the detected object to the sets of identification characteristics of registered identification profiles in the list of persons that are currently tracked in the defined area is performed by calculating confidence scores based on a correlation between the created set of identification characteristics of the detected object and the sets of identification characteristics of registered identification profiles in the list of persons that are currently tracked in the defined area; and
   wherein the determination of the identification profile that comprises the set of identification characteristics that best match the created set of identification characteristics is performed by selecting an identification profile comprising a set of identification characteristics of the detected object corresponding to a confidence score representing the highest correlation with the created set of identification characteristics of the detected object.

3. The method according to claim 2, wherein the act of connecting is not performed if the calculated confidence score corresponding to the identification profile comprising the set of identification characteristics with the highest correlation to the created set of identification characteristics of the detected object is smaller than a first predetermined threshold.

4. The method according to claim 3, wherein an alert is generated if the calculated confidence score corresponding to the identification profile comprising the set of identification characteristics with the highest correlation to the created set of identification characteristics of the detected object is smaller than the first predetermined threshold.

5. The method according to claim 1, further comprising:
   identifying a person leaving the defined area by matching credentials presented by the person leaving the defined area to credentials in a database including credentials of preregistered persons; and
   removing an identification profile of the person leaving the defined area from the list of persons that are currently tracked in the defined area.

6. The method according to claim 1, further comprising:
   removing an identification profile of a person from the list of persons currently tracked in the defined area if a predetermined activity time period has passed since the last point in time a detected object was connected to the identification profile of the person from the list of persons tracked in the defined area.

7. The method according to claim 1, further comprising:
   registering the identification profile of the identified person in a list of persons that has entered the defined area.

8. The method according to claim 7, wherein if a calculated confidence score corresponding to an identification profile comprising a set of identification characteristics with the highest correlation to the created set of identification characteristics of the detected object in the received image data is smaller than a second predetermined threshold;
   the act of connecting is not performed;
   and the method is further comprising:
   comparing the created set of identification characteristics of the detected object to the sets of identification characteristics of the registered identification profiles in the list of persons that have entered the area;
   determining an identification profile in the list of persons that have entered the defined area that comprises a set of identification characteristics that best match the created set of identification characteristics of the detected object; and
   connecting the detected object in the received image data to the determined identification profile comprising the set of identification characteristics that best match the created set of identification characteristics of the detected object.

9. The method according to claim 8, wherein the comparison of the created set of identification characteristics of the detected object to the sets of identification characteristics of the registered identification profiles in the list of persons that have entered the defined area is performed by calculating confidence scores based on a correlation between the created set of identification characteristics of the detected object and the sets of identification characteristics of the registered identification profiles of the persons in the list of persons that have entered the defined area; and wherein the determination of the identification profile in the list of persons that have entered the defined area that comprises the set of identification characteristics of the detected object that best match the created set of identification characteristics of the detected object is performed by selecting an identification profile comprising a set of identification characteristics with the highest correlation to the created set of identification characteristics of the detected object.

10. The method according to claim 1, wherein information in the set of identification characteristics describing the appearance of a person, is selected from the group consisting of: characteristic geometrical parameters of a body or a face of a person, mathematical expressions representing facial features or features of a body of a person, texture parameters of a person's clothing, skin or face, color spectrum from an image of a person or part of a person, gait of a person, a movement pattern of a person.

11. The method according to claim 10, further comprises updating information in the identification profile comprising the set of identification characteristics that best match the created set of identification characteristics of the detected object with information from the created set of identification characteristics of the detected object.

12. The method according to claim 11, wherein the act of updating information in the identification profile comprising the set of identification characteristics that best match the created set of identification characteristics of the detected object is performed by calculating a statistical measure based on present information in the identification profile comprising the set of identification characteristics that best match the created set of identification characteristics of the detected object and information from the created set of identification characteristics of the detected object.

13. The method according to claim 1, wherein the step of connecting the detected object to the determined identification profile that best match the created set of identification characteristics of the detected object further is comprising registering information related to the received image data selected from the group of an identifier of the image acquisition device that acquired the image data, the point in time in which the image data was acquired by the image acquisition device and the position of the image acquisition device that acquired the image data.

14. A computer program product comprising a non-transitory computer-readable storage medium with instructions adapted to carry out the method according to claim 1.

15. The method of claim 1, further comprising preregistering the identification profile of the identified person comprising the set of identification characteristics describing the appearance of the person in the database.

16. The method of claim 1, wherein the reading the credentials further comprises reading the credentials using a credential input device, wherein the credential input device is used by the person entering the defined area to request access to the defined area by presenting the credentials.

17. A system for tracking a person, comprising:
a database that stores credentials of preregistered persons;
a memory that stores a list of persons that are currently tracked in a defined area;
at least one camera that acquires image data from a scene within the defined area; and
a processor that is communicatively coupled to the database, the memory and the at least one camera, wherein the processor is configured to:

identify a particular person entering the defined area by reading credentials presented by the particular person when requesting access to the defined area and matching the credentials presented by the particular person to credentials in the database,
register an identification profile of the particular person in the list of persons that are currently tracked, wherein the identification profile comprises identification characteristics describing an appearance of the particular person,
create a set of identification characteristics for an object detected in image data acquired by the at least one camera;
compare the created set of identification characteristics of the detected object to sets of identification characteristics of identification profiles registered in the list of persons that are currently tracked in the defined area,
determine an identification profile in the list of persons that are currently tracked in the defined area that comprises a set of identification characteristics that best match the created set of identification characteristics of the detected object, and
connect the detected object to the identification profile determined that best match the identification profile of the detected object.

18. The system according to claim 17, wherein the processor is further configured to:
register an identification profile of the particular person in a list of persons that have entered the defined area, the identification profile of the particular person in the list of persons that have entered the area comprising information for identifying the particular person from image data;
deregister the identification profile of the particular person from the list of persons currently tracked in the defined area if a predetermined activity time period has passed since the last point in time a detected object was connected to the identification profile of the particular person in the list of persons that have entered the area; and
compare the created set of identification characteristics of the detected object in image data to the sets of identification characteristics of the registered identification profiles in the list of persons currently tracked in the defined area and determine an identification profile in the list of persons currently tracked in the defined area comprising a set of identification characteristics that best match the created set of identification characteristics of the detected object in image data.

19. The system of claim 18, wherein the reading the credentials further comprises reading the credentials using a credential input device, wherein the credential input device is used by the particular person entering the defined area to request access to the defined area by presenting the credentials.

20. The system of claim 17, further comprising a preregistration module comprising a camera configured to capture images of the particular person for preregistration of the identification profile of the particular person comprising the identification characteristics describing the appearance of the particular person in the database.

* * * * *